(12) United States Patent
Maeda

(10) Patent No.: US 8,265,475 B2
(45) Date of Patent: Sep. 11, 2012

(54) FOCUS-POINT SELECTION SYSTEM, AUTOFOCUS SYSTEM, AND CAMERA

(75) Inventor: Hirokazu Maeda, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 0 days.

(21) Appl. No.: 13/018,555

(22) Filed: Feb. 1, 2011

(65) Prior Publication Data
US 2011/0200315 A1    Aug. 18, 2011

(30) Foreign Application Priority Data
Feb. 15, 2010    (JP) .................................. 2010-030347

(51) Int. Cl.
   *G03B 3/00* (2006.01)
(52) U.S. Cl. ........................................ 396/124
(58) Field of Classification Search .................. 396/124
   See application file for complete search history.

(56) References Cited

U.S. PATENT DOCUMENTS

| | | | |
|---|---|---|---|
| 5,128,705 A * | 7/1992 | Someya et al. | 396/123 |
| 5,555,068 A * | 9/1996 | Utagawa | 396/121 |
| 6,453,124 B2 | 9/2002 | Morimoto et al. | |
| 6,670,992 B2 * | 12/2003 | Irie | 348/350 |
| 7,839,448 B2 * | 11/2010 | Onozawa | 348/347 |
| 7,995,910 B2 * | 8/2011 | Kageyama | 396/128 |
| 2001/0053292 A1 * | 12/2001 | Nakamura | 396/661 |
| 2004/0028401 A1 * | 2/2004 | Nonaka | 396/121 |
| 2008/0316325 A1 | 12/2008 | Nakahara | |
| 2010/0027983 A1 * | 2/2010 | Pickens et al. | 396/125 |

FOREIGN PATENT DOCUMENTS

JP    2001-281530    10/2001

* cited by examiner

*Primary Examiner* — Rodney Fuller
(74) *Attorney, Agent, or Firm* — Greenblum & Bernstein, P.L.C.

(57) ABSTRACT

A focus-point selection system comprising an image sensor, a target detector, a location detector, and a first selector is provided. The focus-point selection system selects a subset of focus points corresponding to the location of a target in an image capturing area from a plurality of focus points positioned at predetermined locations. The target is a subject that is brought into focus according to a phase-difference autofocus method. The image sensor generates an image signal corresponding to the captured optical image. The target detector detects the target on the basis of the image signal. The location detector detects a subject location. The subject location is a location of the target detected by the target detector in the image capturing area. The first selector selects the focus point with the shortest distance from the subject location.

18 Claims, 8 Drawing Sheets

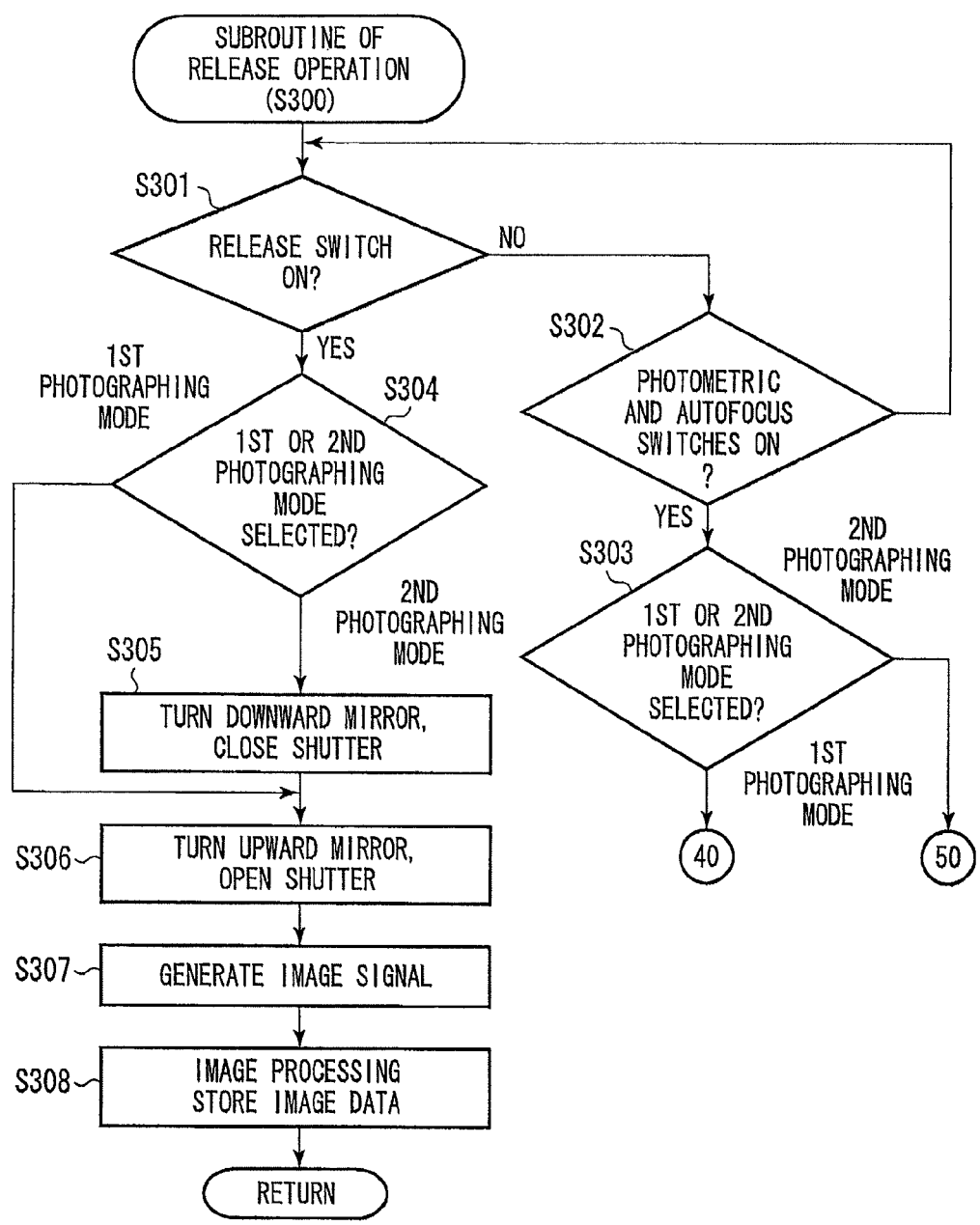

FOCUS-POINT SELECTION SYSTEM, AUTOFOCUS SYSTEM, AND CAMERA

BACKGROUND OF THE INVENTION

1. Field of the Invention

The present invention relates to a focus-point selection system that selects one focus point from among a plurality of focus points to use in an autofocus operation for quickly bringing a desired subject into focus.

2. Description of the Related Art

The phase-difference autofocus function and the contrast autofocus function are commonly used autofocus methods that automatically bring a subject into focus on an imaging surface.

The phase-difference autofocus function has been the generally adopted autofocus method for single-lens reflex (SLR) digital cameras because of its effectiveness at quickly completing a autofocus operation. U.S. Pat. No. 6,453,124 discloses that in the phase-difference autofocus function, a focus lens is adjusted so that an optical image at a predetermined focus point in a photographic area is brought into focus on the imaging surface.

A recent SLR digital camera has a live view function that displays a real-time image of a subject on a monitor while a release operation is not underway. In order to carry out the live view function, an optical image of a subject must be captured by an image sensor.

An image signal generated by the image sensor upon capturing an optical image can be used not only for displaying a real-time image on the monitor, but also for analyzing an optical image. From the analysis of an optical image specific kinds of targets, such as a human face for example, can be automatically detected. It is proposed that an exposure adjustment operation and an autofocus operation be carried out for the detected target.

The location of a detected target does not generally coincide with a certain focus point at a predetermined location in the photographing area. Accordingly, in the case where a target to be photographed is automatically detected, the contrast autofocus function, which can bring a subject located anywhere in the photographing area into focus, is carried out instead of the phase-difference autofocus function.

However, the contrast autofocus function is problematic because its autofocus operation is relatively time consuming due its process of determining whether a subject remains in focus as the focusing lens is adjusted.

SUMMARY OF THE INVENTION

Therefore, an object of the present invention is to provide a focus-point selection system that selects an adequate focus point when a camera, which can automatically detect a targeted subject, carries out the phase-difference autofocus function.

According to the present invention, a focus-point selection system comprising an image sensor, a target detector, a location detector, and a first selector, is provided. The focus-point selection system selects a subset of focus points corresponding to the location of a target in an image capturing area from a plurality of focus points positioned at predetermined locations in the image capturing area. The target is a subject that is brought into focus according to a phase-difference autofocus method. The image sensor captures an optical image of the image capturing area and generates an image signal corresponding to the captured optical image. The target detector detects the target on the basis of the image signal. The location detector detects a subject location. The subject location is a location of the target detected by the target detector in the image capturing area. The first selector selects the focus point with the shortest distance from the subject location.

BRIEF DESCRIPTION OF THE DRAWINGS

The objects and advantages of the present invention will be better understood from the following description, with reference to the accompanying drawings in which:

FIG. 8 is a flowchart illustrating the subroutine of the release operation.

DESCRIPTION OF THE PREFERRED EMBODIMENTS

Figure 1:
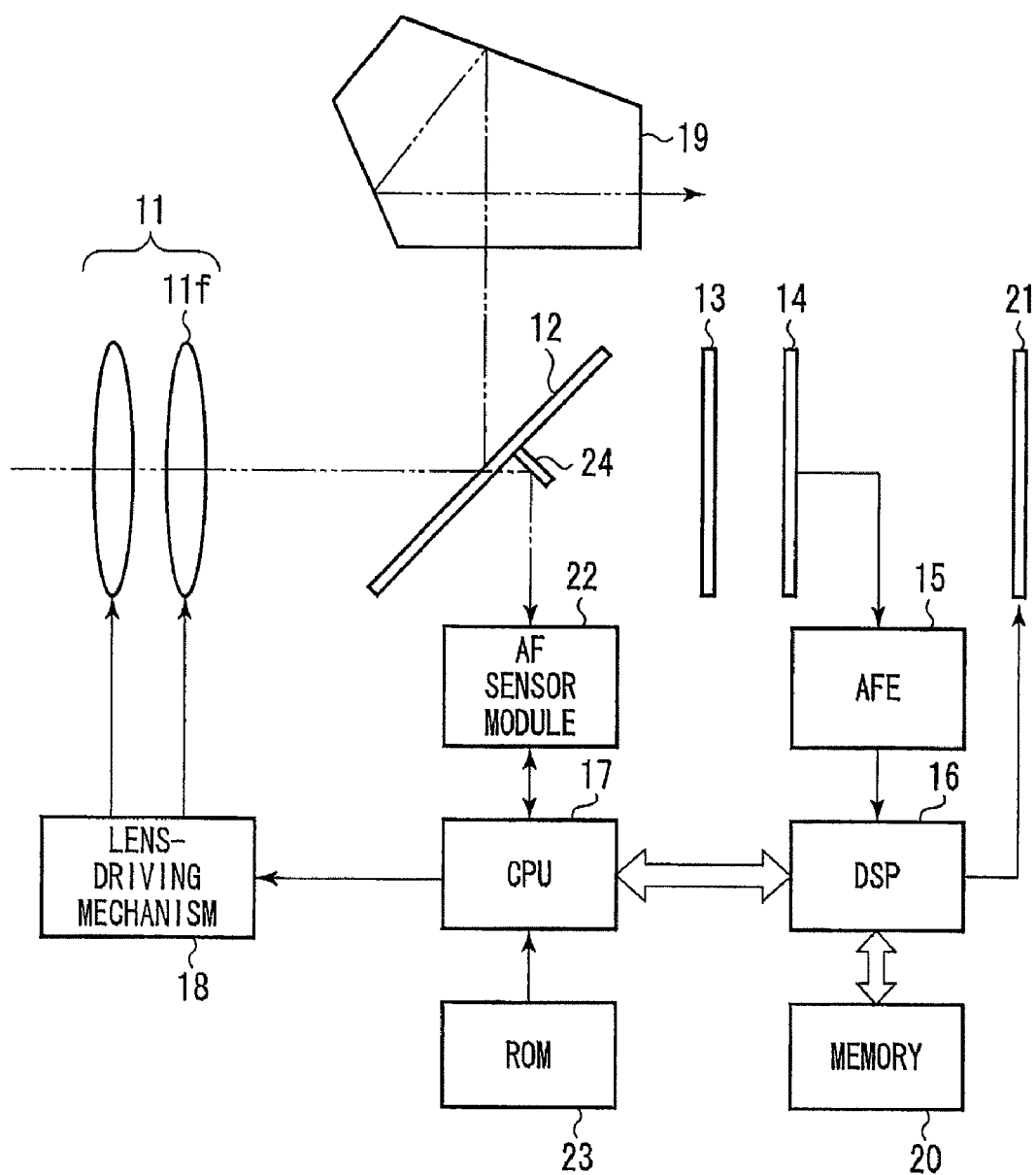
FIG. 1 is a block diagram showing the internal structure of a SLR digital camera having the focus-point selection system of the embodiment of the present invention.

The present invention is described below with reference to the embodiment shown in the drawings.

In FIG. 1, the SLR digital camera 10 comprises a photographic optical system 11, a main mirror 12, a shutter 13, an image sensor 14, an AFE 15, a digital signal processor (DSP) 16 (target detector, location detector, subject detector, second selector, registerer), a CPU 17 (first selector), a lens-driving mechanism 18, and other components.

The photographic optical system 11 comprises a plurality of lenses, including a focus lens 11f and a zoom lens (not depicted). The lens-driving mechanism 18 causes the focus lens 11f and the zoom lens to move along an optical axis of the photographic optical system 11.

The image sensor 14 is arranged on the optical axis of the photographic optical system 11 so that the image sensor 14 is perpendicular to the optical axis. The photographic optical system 11 enables an optical image of a subject to be in focus on a light-receiving surface of the image sensor 14. The main mirror 12 and the shutter 13 are arranged between the photographic optical system 11 and the image sensor 14.

An optical image passing through the photographic optical system 11 reaches different components according to the position of the main mirror 12. When the main mirror 12 is maintained in a closed position on the optical axis, an optical image is reflected by the main mirror 12 to a pentaprism 19 and transmitted to the viewfinder. When the main mirror 12 is turned upward, the optical image passes by the main mirror 12 and reaches the shutter 13. A mirror-driving mechanism (not depicted) changes the position of the main mirror 12.

By opening and closing the shutter 13, an optical image arriving at the image sensor 30 may be controlled. When the shutter 13 is closed, the optical image does not reach the image sensor 14. On the other hand, when the shutter 13 is opened, the optical image can reach the image sensor 14.

When the shutter 13 is opened and the optical image reaches the image sensor 14, the image sensor 14 generates an image signal corresponding to the optical image. The generated image signal undergoes correlated double sampling (CDS) processing and auto gain control (AGC) processing in the AFE 15. In addition, the AFE 15 digitizes the image signal and converts it to image data that are transmitted to the DSP 16.

The DSP 16 carries out predetermined data processing on the received image data. The image data, having undergone predetermined data processing, are stored in a memory 20 or transmitted to an LCD 21, where a captured image is displayed.

The DSP 16 is connected to the CPU 17. The DSP 16 carries out the image data processing and image data storage, and displays the image on the basis of ordered signals transmitted from the CPU 17.

The CPU 17 controls operations of components mounted in the SLR digital camera 10, such as the lens-driving mechanism 18 and an AF sensor module 22. The CPU 17 is connected to a ROM 23 that stores data that the CPU 17 uses to control the components.

The SLR digital camera 10 can carry out a phase-difference autofocus function and a contrast autofocus function. As explained below, while the phase-difference autofocus function is carried out, the main mirror 12 is maintained in a closed position on the optical axis. On the other hand, while the contrast autofocus function is carried out the main mirror 12 is turned upward and the shutter 13 is held open.

The main mirror 12 is a half mirror, so a portion of light passes through the main mirror 12 while another portion is reflected by the main mirror 12. Light passing through the photographic optical system 11 that is reflected by the main mirror 12 reaches the pentaprism 19, as described above. The remaining light that passes through the photographic optical system 11 passes through the main mirror 12 and is reflected toward the AF sensor module 22 by a sub-mirror 24, which is mounted between the main mirror 12 and the shutter 13.

Figure 2:
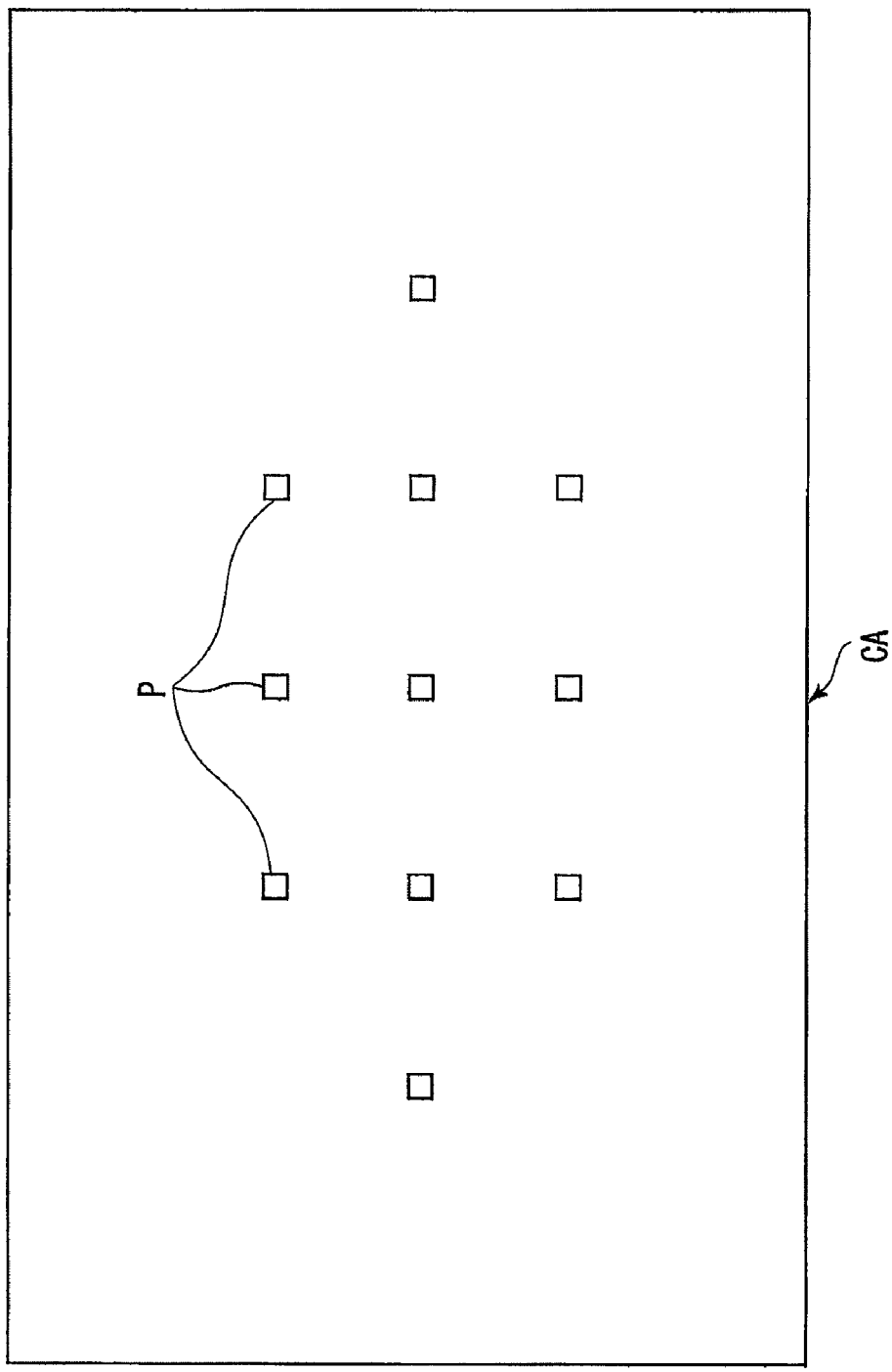
FIG. 2 is a deployment diagram of focus points in an entire image capturing area.

The AF sensor module 22 detects a focus-gap, which is the distance between the present position of the focus lens 11$f$ and the position of the focus lens that brings an optical image into focus. As shown in FIG. 2, the positions of eleven focus points (referred to as "P" in FIG. 2) in an image capturing area (referred to as "CA" in FIG. 2) are predetermined for the AF sensor module 22. The AF sensor module 22 detects the focus-gap for the part of an optical image that is located at one of the focus points.

The AF sensor module 22 is connected to the CPU 17. The AF sensor module 22 is controlled by the CPU 17 so as to detect the focus-gap at the specified focus point. Whichever focus point is to be used can either be selected manually by a user via the selection button (not depicted), or automatically by the CPU 17 as described below.

The detected focus-gap is communicated to the CPU 17. The CPU 17 controls the lens-driving mechanism 18 on the basis of the focus-gap to move the focus lens 11$f$ to the position where the focus lens 11$f$ brings a subject on the specified focus point into focus. As explained here, in the phase difference function, an autofocus operation is carried out by moving the focus lens 11$f$ on the basis of the detected focus-gap.

On the other hand, as described above, while the contrast autofocus function is carried out the main mirror is kept in the upward-turned position and the shutter 13 is held open. An optical image of a subject then reaches the image sensor 14, and the image sensor 14 successively generates a plurality of image signals.

As described above, the generated image signals are transmitted to the DSP 16 via the AFE 15. The DSP 16 calculates a contrast value at a specified location in the image capturing area. The specified location can be selected by user's manual input via the selection button (not depicted), or it can be determined automatically by the CPU 17.

Once one frame of an image signal has been generated, the focus lens 11$f$ is readjusted per the control of the CPU 17. After the focus lens 11$f$ is readjusted, the next frame of an image signal is generated and the process is repeated. Each time the focus lens 11$f$ is readjusted contrast values are recalculated for a new frame of the image signal.

The maximum calculated contrast value corresponds to the condition in which the subject is determined to be in focus. In the contrast autofocus function, the focus lens 11$f$ is moved to the position where the contrast value is maximized, and an autofocus operation is carried out.

Both the phase-difference and contrast autofocus functions can be carried out when the operation mode of the SLR digital camera 10 is set to either a first or second photographing mode. In the first photographing mode, an optical image of a subject is observable on the viewfinder while a release operation is not underway. In the second photographing mode, an optical image of a subject is observable on the LCD 21 while a release operation is not underway. Either the first or second photographing mode is selected by user via the input button.

In the first photographing mode, the main mirror 12 is maintained in a closed position on the optical axis during while a release operation is not underway. As described above, when an optical image of a subject is transmitted to the viewfinder a user can observe the subject on the viewfinder accordingly.

When the release button (not depicted) is depressed halfway, the autofocus switch (not depicted) is activated and the CPU 17 orders the phase-difference autofocus function to be carried out. The photometric switch (not depicted) is also activated when the release button is depressed halfway, in which case the light intensity of a subject is measured and exposure conditions, such as the aperture value of the diaphragm, the shutter speed and the sensitivity (gain) are all determined.

On the other hand, when the release button is fully depressed the release switch (not depicted) is activated and the release operation is carried out. In the release operation, the main mirror 12 is turned upward and the shutter is held open for a period of time that corresponds to the shutter speed. While the main mirror 12 is maintained in its upward-turned position and the shutter is held open, an optical image is captured by the image sensor 14.

An image signal corresponding to the optical image captured by the image sensor 14 is generated. As described above, the generated image signal is transmitted via the AFE 15 to the DSP 16, where it undergoes processing for a static image. The image data is then stored in the memory 20.

In the second photographing mode, the main mirror is turned upward while a release operation is not underway. In addition, the shutter 13 is held open, which allows an optical image of a subject to reach the image sensor 14. The image sensor 14 generates one frame of an image signal per a predetermined time interval, such as 1/60 second.

The generated image signals are transmitted via the AFE 15 to the DSP 16, as described above, and the image data undergoes image processing that is carried out by the DSP 16 for a moving image. The image data is then transmitted to the LCD 21. An image corresponding to the received image data is displayed on the LCD 21. The image displayed on the LCD 21 is refreshed at a rate that corresponds to the time interval in which new image signals are being generated, which is 1/60 second, as described above. By refreshing the displayed image, a real-time moving image is displayed on the LCD 21.

When the CPU 17 detects that the release button (not depicted) is depressed halfway and the autofocus switch (not depicted) has been activated, either the phase difference or contrast autofocus function is carried out based on a user's input via the input button in the second photographing mode.

When the contrast autofocus function is selected, the main mirror 12 is kept in the upward-turned position while the operations described above are carried out to complete the contrast autofocus function.

On the other hand, when the phase-difference autofocus function is selected, the main mirror 12 is turned down after the autofocus switch is activated. Then, an optical image of a subject reaches the AF sensor module 22. As described above, the AF sensor module 22 detects the focus-gap and the focus lens 11$f$ is adjusted on the basis of the detected focus-gap. After the sensor module 22 detects the focus-gap, the main mirror 12 is turned upward again.

When the photometric switch (not depicted) is activated by halfway depressing the release button is detected, the light intensity of a subject is measured, similar to the first photographing mode. And then the exposure conditions, such as an aperture value of the diaphragm, the shutter speed and sensitivity, are determined.

When photographing is not underway the shutter 13 is held open, which is different from the first photographing mode where the shutter is kept closed. However, once the release button is fully depressed the release switch is activated and the shutter is closed as the release operation commences. Afterward, the shutter is held open for a period of time that corresponds to the shutter speed that has been determined. While the shutter 13 is open, an optical image is captured by the image sensor 14.

An image signal corresponding to the captured optical image is generated by the image sensor 14. The image signal undergoes image processing for a static image and is stored in the memory 20, similar to the first photographing mode.

The SLR digital camera 10 has a face-detection function. The face-detection function can be performed in the second photographing mode. Whether or not the face-detection function is carried out is selected by a user's input via the input button.

When the face-detection function is carried out, an image of a face can be detected in a captured image. When an image of a face is detected, exposure adjustment and autofocus procedures are carried out for the detected face. When the autofocus and photometric switches are activated while the face-detection function is being carried out, a face-detection operation commences. Moreover, the face-detection operation can also commence when the face detection function is carried out under the second photographing mode even if the autofocus and photometric switches are not activated.

As described above, in the second photographing mode a plurality of image signals are generated while a release operation is not underway. The DSP 16 detects an optical image of a face in an image capturing area by conducting image analysis, such as feature extraction and/or color determination, on the received image data.

Figure 3:
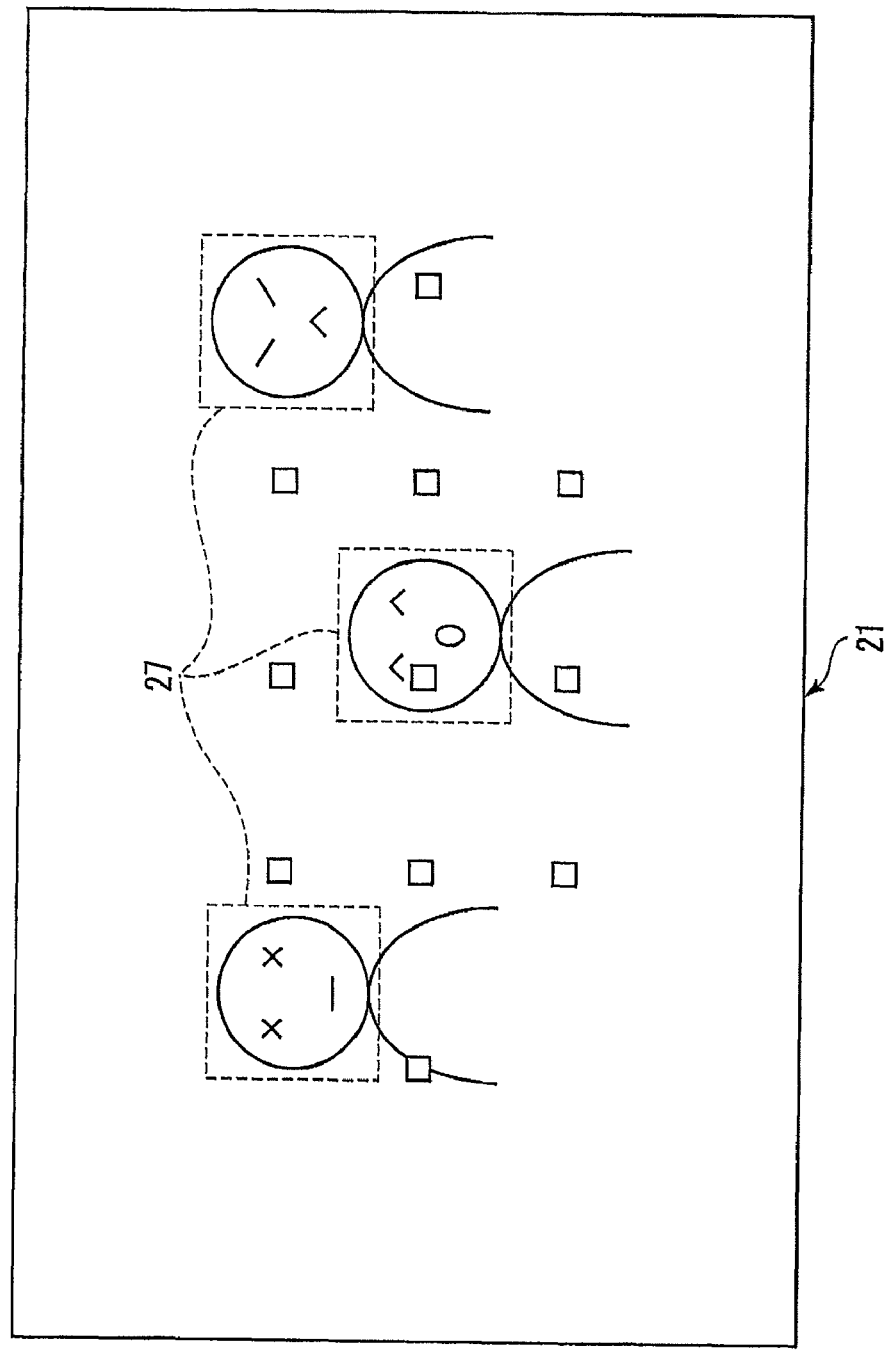
FIG. 3 is an image displayed on an LCD when images of faces are detected.

When the DSP 16 detects the optical image of a face, the outline of a frame enclosing the detected face image is superimposed on the entire displayed image. As shown in FIG. 3, frame lines 27 around each of the detected faces are displayed on the basis of the image data having undergone superimposed image processing.

When a face is detected, exposure adjustment and autofocus procedures are carried out based on the detected face being the main subject (target). If a plurality of face images is detected, a single face is selected to be the main subject for exposure adjustment and autofocus procedures according to a predetermined selection method. For example, a single face is selected based on a method that considers the location and the size of the face images with respect to the entire image capturing area.

Further, a single face for the exposure adjustment and autofocus procedures can be decided upon according to a different selection method that uses a registered face image. For example, if there is a face image that is included in a plurality of registered face images from a plurality of faces detected by the face-detection function, the face image that matches the registered face image is decided upon as the main subject.

A face image can be registered by either selecting specific face images from an image in image data stored in the memory 20 or obtaining from a computer (not depicted) connected to the SLR digital camera 10 via a connector (not depicted).

When a single face image is selected to be the main subject, the DSP 16 detects the light intensity of that particular face image. The exposure conditions as described above are then decided on the basis of the detected light intensity.

In addition, when a single face image is decided to be the main subject, either the phase difference or contrast autofocus function is carried out, as described above.

When the contrast autofocus function is selected, the contrast value is calculated for the location where the face image decided to be the main subject is captured. As described above, the focus lens 11$f$ is adjusted to maximize the contrast value for the location where the face image is captured.

When the phase-difference autofocus function is selected, the location where a face image selected to be the main subject is captured is transmitted as data to the CPU 17. The central point of the frame line 27 or a center point between the eyes of the detected face is selected for the location where the face image is captured.

As described above, in the phase-difference autofocus function, an autofocus operation is carried out for a subject of which an optical image is formed on the specified focus point within the entire image capturing area. The CPU 17 calculates the distances between the location where the face image is captured and all of the focus points.

Out of all of the focus points, the one with the shortest calculated distance from the location of the face image is the focus point used for the autofocus operation. When a single focus point is selected, the AF sensor module 22 detects the focus-gap and moves the focus lens 11$f$ on the basis of the detected focus-gap, as described above.

Even if the face-detection function is carried out, a user can still select at least one specific area in which the light intensity is evaluated and a focus point is determined on the basis thereof.

Figure 4:
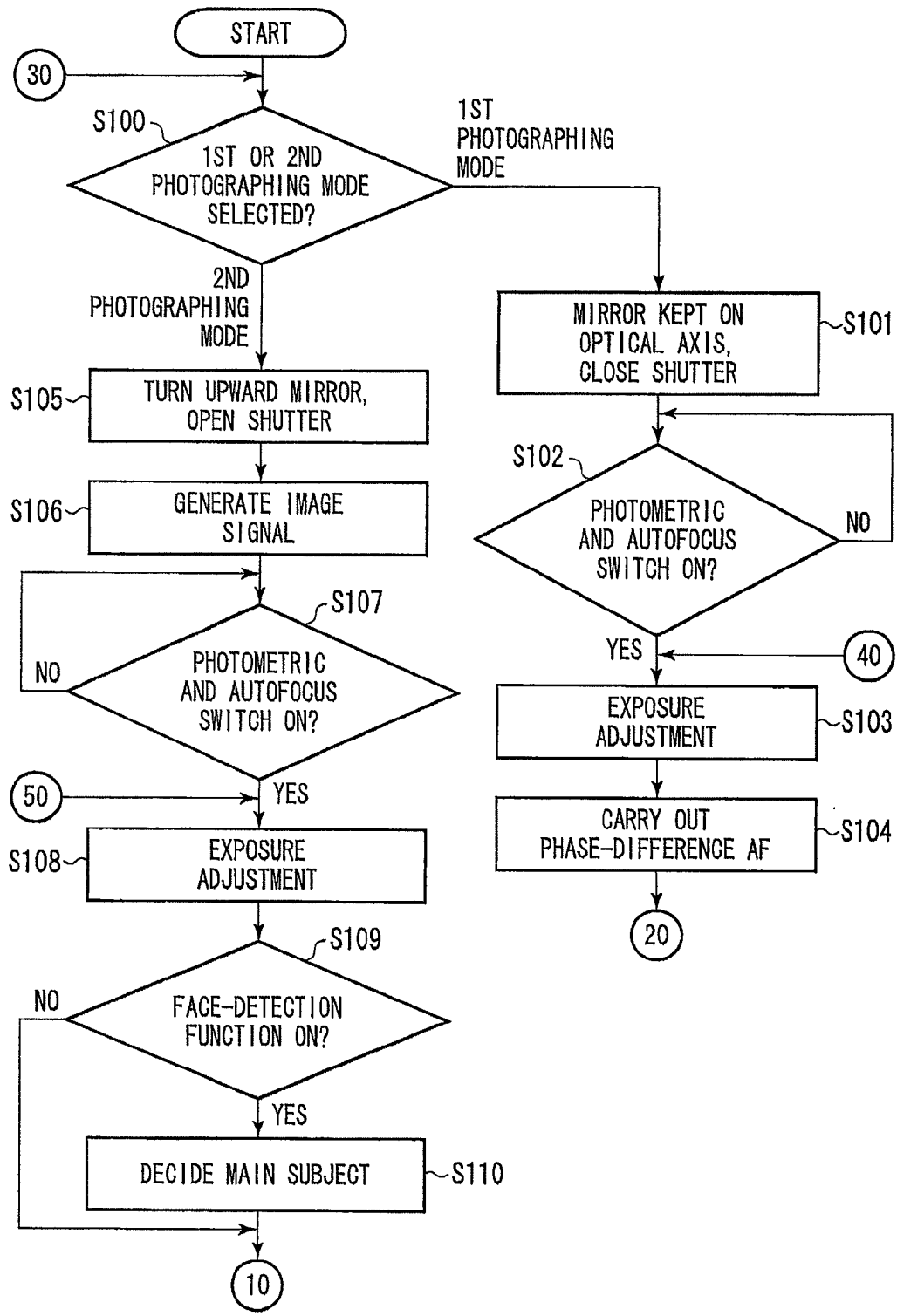
FIG. 4 is a first flowchart illustrating the first part of the procedure carried out by the CPU in the first and second photographing modes.
Figure 5:
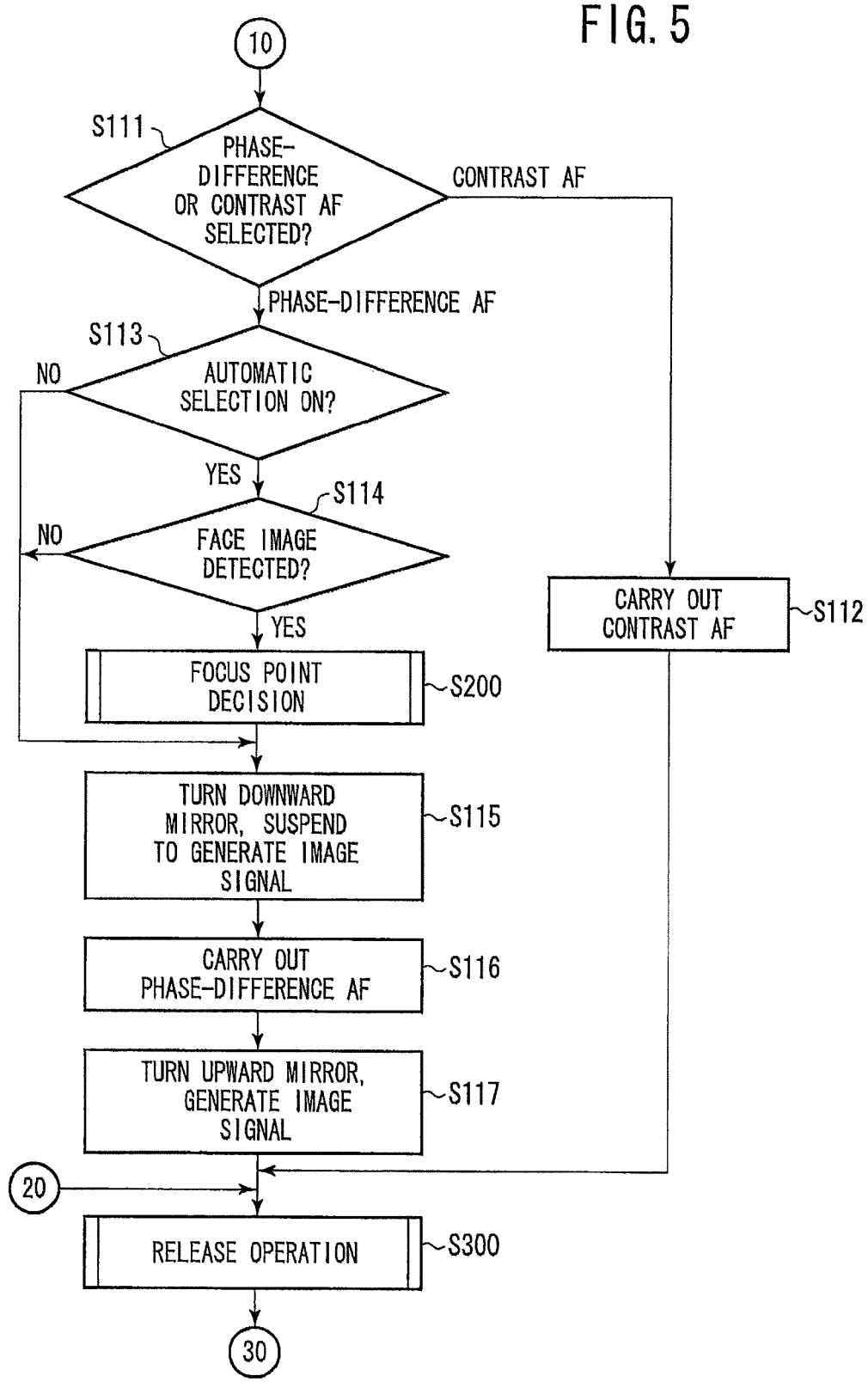
FIG. 5 is a second flowchart illustrating the second part of the procedure carried out by the CPU in the first and second photographing modes.

Next, the control operations carried out by the CPU 17 in the first and second photographing modes are explained using the flowcharts of FIGS. 4 and 5. The control operations commence when the operation mode of the SLR digital camera 10 is set to the first or second photographing mode. The control operation terminates when the SLR digital camera 10 is switched off or the operation mode is changed to another operation mode.

At step S100, the CPU 17 determines whether the first or second photographing mode is selected. When the first photographing mode is selected, the process proceeds to step S101. When the second photographing mode is selected, the process proceeds to step S105.

At step S101, under the direction of the CPU 17 the main mirror 12 is maintained in its closed position on the optical axis and the shutter 13 is kept closed. After the positions of the main mirror 12 and the shutter 13 are adjusted, the process proceeds to step S102.

At step S102, the CPU 17 determines whether or not the photometric switch and the autofocus switch are activated. When both of the switches are not activated, step S101 is repeated until both switches are activated. When both switches are activated, the process proceeds to step S103.

At step S103, under the direction of the CPU 17 the light intensity of a subject is detected. On the basis of the detected light intensity the exposure is adjusted by the CPU 17. After carrying out the exposure adjustment, the process proceeds to step S104.

At step S104, under the direction of the CPU 17 the AF sensor module 22 detects the focus-gap for a subject at a specified focus point. The CPU 17 then controls the lens-driving mechanism 18 to adjust the focus lens 11$f$ on the basis of the detected focus-gap. After these processes for the phase-difference autofocus function have been carried out, the process proceeds to step S300.

As described above, when it is determined at step S100 that the second photographing mode has been selected, the process proceeds to step S105. At step S105, under the direction of the CPU 17 the main mirror 12 is turned upward and the shutter 13 is held open. After the main mirror 12 is turned upward and the shutter 13 is opened, the process proceeds to step S106.

At step S106, under the direction of the CPU 17 the image sensor 14 captures an optical image of a subject and generates a new frame of an image signal every ¹⁄₆₀ second. In addition, after the image signal is generated the CPU 17 directs the DSP 16 to carry out image data processing for a moving image and to transmit the image data to the LCD 21. Under the direction of the CPU 17 the LCD 21 displays an image corresponding to the transmitted image data. After generating an image signal and displaying an image has commenced, the process proceeds to step S107.

At step S107, the CPU 17 determines whether or not the photometric and autofocus switches are activated. When both switches are not activated, step S107 is repeated until they are activated. When both switches are activated, the process proceeds to step S108.

At step S108, the CPU 17 carries out the same control operation as in step S103. Accordingly, the light intensity of a subject is detected and the exposure is adjusted on the basis of the detected light intensity. After carrying out the exposure adjustment operation, the process proceeds to step S109.

At step S109, the CPU 17 determines whether or not the face-detection function has been activated. When the face-detection function is activated, the process proceeds to step S110. When the face-detection function is not activated, the process skips step S110 and proceeds to step S111.

At step S110, under the direction of the CPU 17 the DSP 16 detects a face image on the basis of the image data and selects a main subject on the basis of the detected face image. Upon deciding the main subject, the process proceeds to step S111.

At step S111, the CPU 17 determines whether the contrast or phase-difference autofocus function is selected. When the contrast autofocus function is selected, the process proceeds to step S112. When the phase-difference autofocus function is selected, the process proceeds to step S113.

At step S112, the contrast autofocus function is carried out. As described above, under the direction of the CPU 17 the DSP 16 calculates the contrast value on the basis of the image data generated for each position of the adjusted focus lens 11$f$. The CPU 17 also instructs the lens-driving mechanism 18 to reposition the focus lens 11$f$ so that the contrast value is maximized. After completion of the contrast autofocus function, the process proceeds to step S300.

As described above, when the phase-difference autofocus function is determined as the selected autofocus function in Step S111, the process proceeds to step S113. At step S113, the CPU 17 determines whether a focus-point automatic selection function is activated and a single focus point has not specified.

When the focus-point automatic selection function is activated, the process proceeds to step S114; otherwise, the process skips steps S114 and S200, and proceeds to step S115.

At step S114, the CPU 17 determines whether a face image is detected at step S111. When a face image is detected, the process proceeds to step S200. When a face image is not detected, the process proceeds to step S115.

At step S200, the CPU 17 decides upon a single focus point where a focus-gap is to be detected, which will be explained in detail later. After the single focus point is chosen, the process proceeds to step S115.

At step S115, under the direction of the CPU 17 the main mirror 12 is turned downward and maintained in closed position on the optical axis. In addition, the CPU 17 orders the image sensor 14 to stop generating an image signal. After the main mirror 12 is turned downward, the process proceeds to step S116.

At step S116, the phase-difference autofocus function is carried out under the direction of the CPU 17. As described above, the AF sensor module 22 detects the focus-gap at a focus point decided upon at step S200 for a subject so that the lens-driving mechanism 18 can then adjust the focus lens 11$f$ on the basis of the detected focus-gap. After the phase-difference autofocus function is complete, the process proceeds to step S117.

At step S117, the main mirror 12 is turned upward and the image sensor 14 generates an image signal under the direction of the CPU 17. After the main mirror 12 is turned upward, the process proceeds to step S300.

As described above, after conducting the operations described in steps S104, S112, and S117, the process proceeds to step S300 where the release operation is carried out under the direction of the CPU 17. After the release operation the process returns to step S100.

Figure 6:
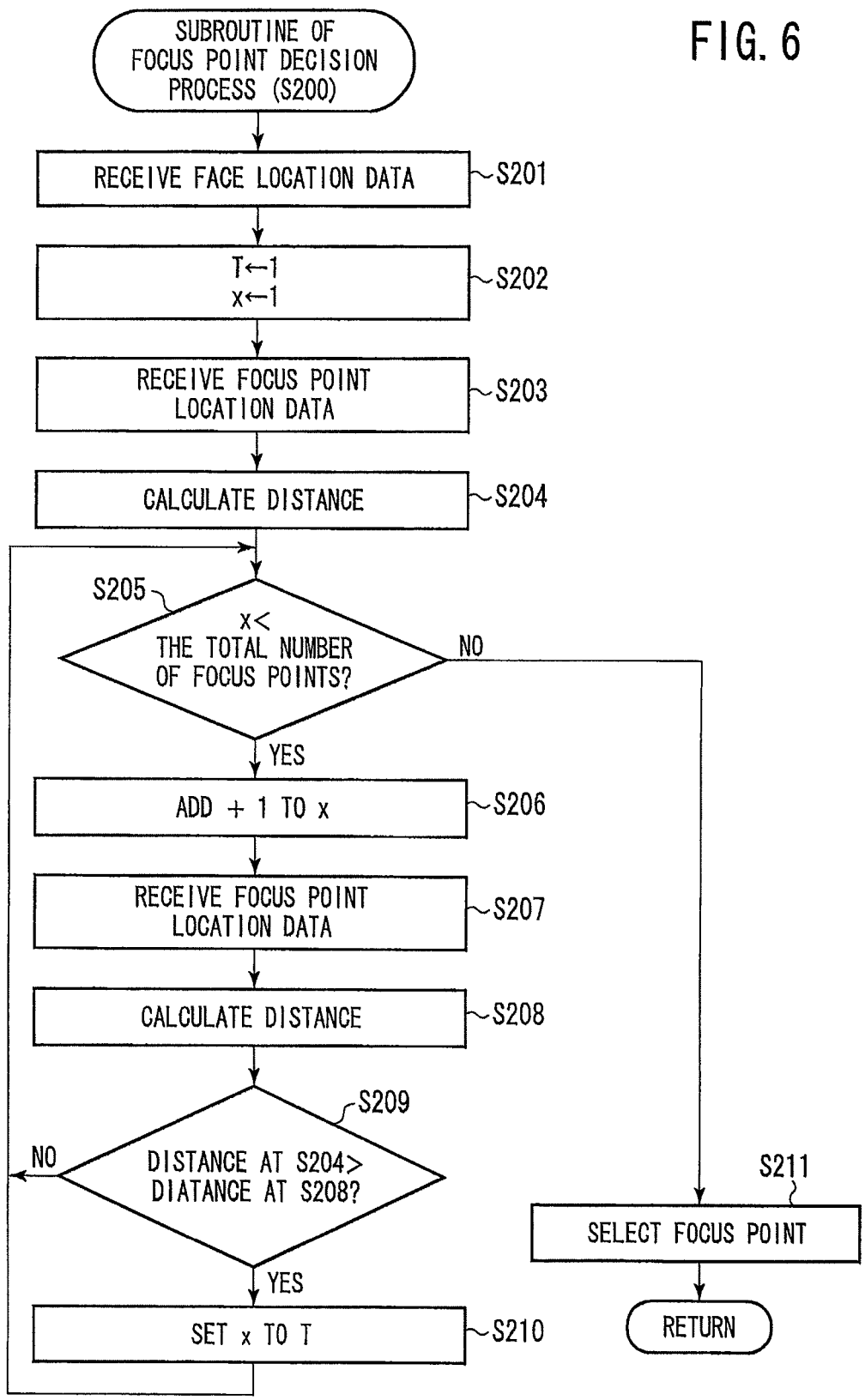
FIG. 6 is a flowchart illustrating the subroutine of the focus point decision process.

Next, a subroutine of the focus point decision process (S200) is explained below using the flowchart of FIG. 6.

At step S201, the CPU 17 receives from the DSP 16 the location data for the face image that was determined to be the main subject in step S110. The process then proceeds to step S202.

At step S202, the CPU 17 resets a final selection number (referred to as "T" in FIG. 6) to 1. The final selection number is the number of one focus point selected in the focus point decision process. In addition, the CPU 17 resets a temporary selection number (referred to as "x" in FIG. 6) to 1. The temporary selection number is the number of a focus point that is selected only temporarily. After resetting the final and temporary selection numbers, the process proceeds to step S203.

Figure 7:
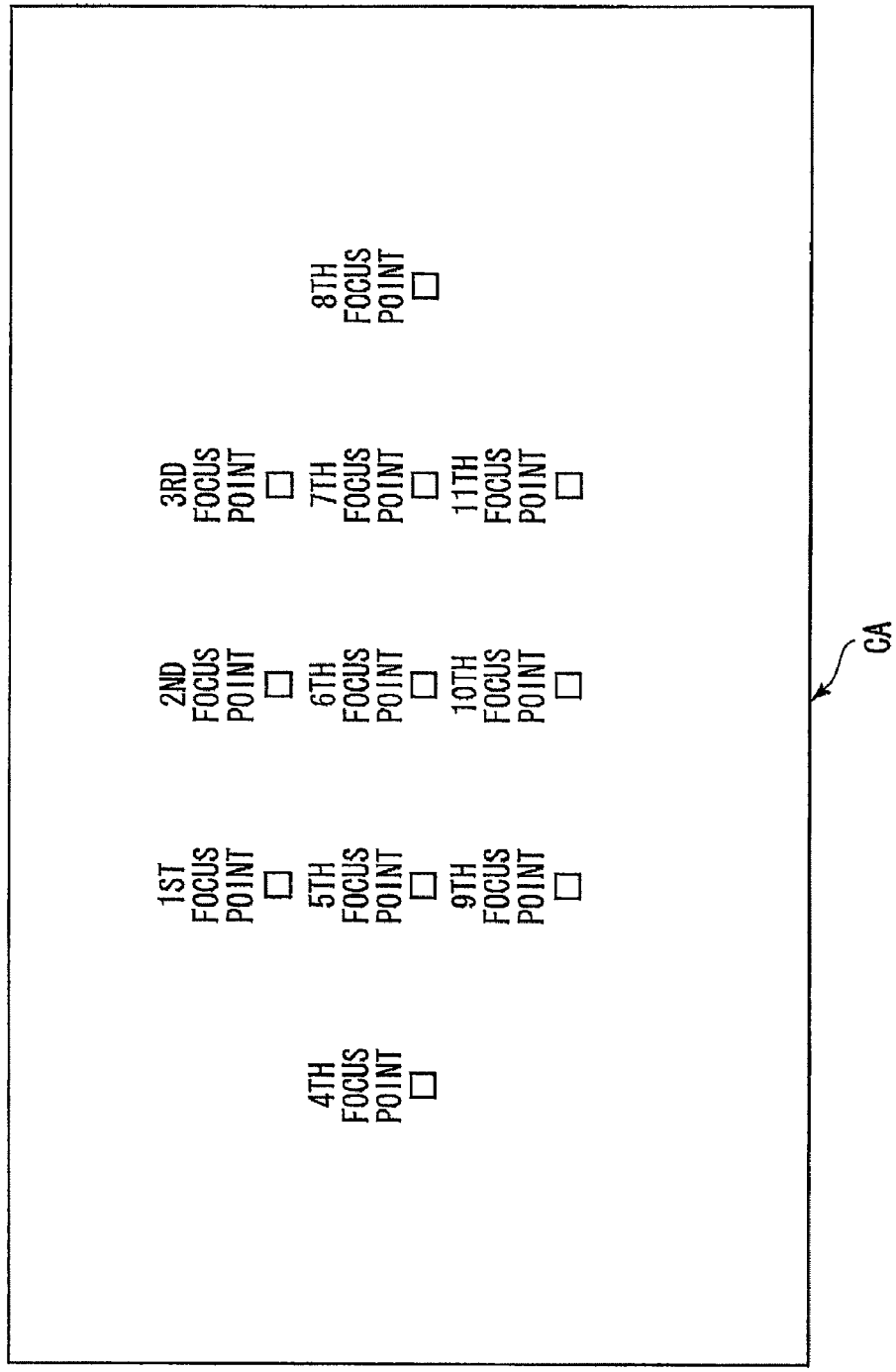
FIG. 7 is a deployment diagram of first to eleventh focus points in an entire image capturing area.

A different number is assigned to each different focus point. As shown in FIG. 7, "1", "2" and "3" are assigned to the first, second, and third focus points, respectively, arranged from left to right in the upper row of the entire image capturing area (referred to as "CA" in FIG. 7), while "4", "5", "6", "7", and "8" are given to the fourth through eighth focus points arranged from left to right in the middle row, and "9", "10" and "11" are given to the ninth through eleventh focus points arranged from left to right in the lower row.

At step S203, the CPU 17 reads out data corresponding to the location of the focus point with a given number that is equal to the final selection number from the ROM 23. After reading out the location data, the process proceeds to step S204.

At step S204, the CPU 17 calculates the distance between the location of the face image read out at step S201 and the location of the focus point read out at step S203. After the distance is calculated, the process proceeds to step S205.

At step S205, the CPU 17 determines whether or not the temporary selection number is less than the total number of focus points. When the temporary selection number is less than the total number of focus points, the process proceeds to step S206. When the temporary selection number is equal to or greater than the total number of focus points, the process proceeds to step S211.

At step S206, the CPU 17 adds 1 to the temporary selection number and the process proceeds to step S207.

At step S207, the CPU 17 reads out data corresponding to the location of the focus point with a given number that is equal to the temporary selection number from the ROM 23. After reading out the location data, the process proceeds to step S208.

At step S208, the CPU 17 calculates the distance between the location of the face image readout at step S201 and the location of the focus point read out at step S207. After the distance is calculated, the process proceeds to step S209.

At step S209, the CPU 17 compares the distances calculated at steps S204 and S208. When the distance calculated at step S204 is greater than the distance calculated at step S208, the process proceeds to step S210. When the distance calculated at step S204 is equal to or less than the distance calculated at step S208, the process returns to step S205.

At step S210, the CPU sets the temporary selection number to the final selection number. In addition, the distance calculated at step S208 is used in place of the distance calculated at step S204. Accordingly, the replaced distance originally calculated in step S204 is used for the distance in step S209. After setting the new final selection number, the process returns to step S205.

Similar to the processes of steps S205 to S210, the distances from the location of the face image to each one of the focus points are calculated and compared with one another. Finally, the number given to the focus point with the shortest distance from the face image is selected as the final selection number.

As described above, when it is determined at step S205 that the temporary selection number is equal to or greater than every number given to each of the focus points, the process proceeds to step S211. At step S211, the CPU 17 selects the focus point with the given number that is equal to the final selection number. After selecting the focus point, the subroutine of the focus point decision process terminates and the process proceeds to step S115.

Next, a subroutine of the release operation (S300) is explained below using the flowchart of FIG. 8.

At step S301, the CPU determines whether or not the release switch is activated. When the release switch is not activated, the process proceeds to step S302. When the release switch is activated, the process proceeds to step S304.

At step S302, the CPU 17 determines whether or not the photometric and autofocus switches are have been activated. When both switches are not activated, the process returns to step S301. When both switches are activated, the process proceeds to step S303.

At step S303, the CPU 17 determines whether the first or second photographing mode is selected. When the first photographing mode is selected, the process returns to step S103. When the second photographing mode is selected, the process proceeds to step S105.

As described above, when it is determined at step S301 that the release switch is activated, the process proceeds to step S304 where the CPU 17 determines whether the first or second photographing mode has been selected.

When the second photographing mode is selected, the process proceeds to step S305 where the main mirror 12 is turned downward and maintained on the optical axis and the shutter is closed under the direction of the CPU 17. After the positions of the main mirror 12 and the shutter 13 have been adjusted, the process proceeds to step 306. When the first photographing mode is selected, the process skips step S305 and proceeds directly to step S306.

At step S306, the main mirror 12 is turned upward and the shutter 13 is held open for the duration of the period decided in the exposure adjustment process. After the shutter 13 is opened and closed, the process proceeds to step S307.

At step S307, under the direction of the CPU 17 the image sensor generates an image signal corresponding to an optical image of a subject that is captured while the shutter 13 is open. After generation of the image signal, the process proceeds to step S308.

At step S308, the DSP 16 carries out image processing for a static image and stores the image data in the memory 20, under the direction of the CPU 17. After the image data is stored, the subroutine of the release operation terminates and the process returns to step S100.

In the above embodiment, even if no focus points coincide with the location of a detected main subject, the most adequate focus point can be selected. Because the most adequate focus point can be selected, the phase-difference autofocus function can be carried out if a main subject, such as a face, is automatically detected. Accordingly, the autofocus operation can be completed quickly.

A face is detected on the basis of the image data in the above embodiment. However, another kind of subject other than a face can also be detected. For example, an animal, such as a cat or dog, or a plant, such as a flower, can be detected.

The most appropriate focus point for the detected face image was chosen from among eleven total focus points in the above embodiment. However, the most appropriate focus point for the detected face image can be decided from among a partial set of selected focus points. For example, the most appropriate focus point for the detected face image can be selected from among only the second, fifth, sixth, seventh, and tenth focus points.

The AF sensor module 22 has eleven focus points in the above embodiment. However, the number of focus points is not limited to eleven. The same effect can be achieved as long as the AF sensor module 22 has a plurality of focus points.

The focus-point selection system of the above embodiment is adopted for a SLR digital camera. However, the focus-point selection system can be adopted for any kind of digital camera that has a phase-difference autofocus function and a function for detecting a main subject on the basis of image data.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2010-030347 (filed on Feb. 15, 2010), which is expressly incorporated herein, by reference, in its entirety.

The invention claimed is:

1. A focus-point selection system that selects a subset of focus points corresponding to the location of a target in an image capturing area from a plurality of focus points positioned at predetermined locations in the image capturing area, the target being a subject that is brought into focus according to a phase-difference autofocus method, the focus-point selection system comprising:
- an image sensor that captures an optical image of the image capturing area and generates an image signal corresponding to the captured optical image;
- a target detector that detects the target on the basis of the image signal;
- a location detector that detects a subject location, the subject location being a location of the target detected by the target detector in the image capturing area; and
- a first selector that selects a focus point with the shortest distance from the subject location among the plurality of focus points.

2. A focus-point selection system according to claim 1, wherein the target detector comprises a subject detector and a second selector, the subject detector detects all subjects belonging to a certain category that are present in the image capturing area on the basis of the image signal, the second selector selects a single subject as the target from among all subjects detected by the subject detector.

3. A focus-point selection system according to claim 2, wherein the second selector selects a single subject as the target from among all subjects detected by the subject detector according to a predetermined selection method.

4. A focus-point selection system according to claim 3, wherein the target detector comprises a target registerer that registers and maintains a registry of images of subjects as target candidates, a single subject that is similar to at least one of the target candidates is selected as the target from among all subjects detected by the subject detector according to the predetermined selection method.

5. A focus-point selection system according to claim 1, wherein the subject belonging to a certain category is a face.

6. A focus-point selection system according to claim 1, wherein a plurality of focus points that the first selector selects from are designated from all focus points.

7. An autofocus system comprising:
- a memory that records positions of a plurality of focus points positioned at predetermined locations in an image capturing area;
- an image sensor that captures an optical image of the image capturing area and generates an image signal corresponding to the captured optical image;
- a target detector that detects a target on the basis of the image signal, the target being a subject that is brought into focus;
- a first location detector that detects a subject location, the subject location being a location of the target detected by the target detector in the image capturing area;
- a first selector that selects a focus point with the shortest distance from the subject location among the plurality of focus points;
- a second location detector that detects a position of a focus lens according to a phase difference method so that a subject located at the focus point selected by the selector is brought into focus; and
- a lens driver that moves the focus lens to the location detected by the second location detector.

8. An autofocus system according to claim 7, wherein the target detector comprises a subject detector and a second selector, the subject detector detects all subjects belonging to a certain category that are present in the image capturing area on the basis of the image signal, the second selector selects a single subject as the target from among all subjects detected by the subject detector.

9. An autofocus system according to claim 8, wherein the second selector selects a single subject as the target from among all subjects detected by the subject detector according to a predetermined selection method.

10. An autofocus system according to claim 9, wherein the target detector comprises a target registerer that registers and maintains a registry of images of subjects as target candidates, a single subject that is similar to at least one of the target candidates is selected as the target from among all subjects detected by the subject detector according to the predetermined selection method.

11. An autofocus system according to claim 7, wherein the subject belonging to a certain category is a face.

12. An autofocus system according to claim 7, wherein a plurality of focus points that the first selector selects from are designated from all focus points.

13. A camera comprising:
- a memory that records positions of a plurality of focus points positioned at predetermined locations in an image capturing area;
- an image sensor that captures an optical image of the image capturing area and generates an image signal corresponding to the captured optical image;
- a target detector that detects a target on the basis of the image signal, the target being a subject that is brought into focus;
- a first location detector that detects a subject location, the subject location being a location of the target detected by the target detector in the image capturing area;
- a first selector that selects a focus point with the shortest distance from the subject location among the plurality of focus points;
- a second location detector that detects a location of a focus lens according to a phase difference method so that a subject located at the focus point selected by the selector is brought into focus; and
- a lens driver that moves the focus lens to the position detected by the second location detector.

14. A camera according to claim 13, wherein the target detector comprises a subject detector and a second selector, the subject detector detects all subjects belonging to a certain category that are present in the image capturing area on the basis of the image signal, the second selector selects a single subject as the target from among all subjects detected by the subject detector.

15. A camera according to claim 14, wherein the second selector selects a single subject as the target from among all subjects detected by the subject detector according to a predetermined selection method.

16. A camera according to claim 15, wherein the target detector comprises a target registerer that registers and maintains a registry of images of subjects as target candidates, a single subject that is similar to at least one of the target candidates is selected as the target from among all subjects detected by the subject detector according to the predetermined selection method.

17. A camera according to claim 13, wherein the subject belonging to a certain category is a face.

18. A camera according to claim 13, wherein a plurality of focus points that the first selector selects from are designated from all focus points.

* * * * *